(12) United States Patent
Lu et al.

(10) Patent No.: US 6,985,580 B2
(45) Date of Patent: Jan. 10, 2006

(54) AUTO-RELEASED HINGE FOR A MOBILE PHONE

(75) Inventors: Sheng-Nan Lu, Shuling (TW);
Hsiang-Chi Chien, Shuling (TW)

(73) Assignee: Shin Zu Shing Co., Ltd., Shulin (TW)

( * ) Notice: Subject to any disclaimer, the term of this patent is extended or adjusted under 35 U.S.C. 154(b) by 281 days.

(21) Appl. No.: 10/658,822

(22) Filed: Sep. 8, 2003

(65) Prior Publication Data

US 2005/0053231 A1    Mar. 10, 2005

(51) Int. Cl.
*H04M 1/00* (2006.01)
*E05F 1/08* (2006.01)
(52) U.S. Cl. .................................. 379/433.13; 16/303
(58) Field of Classification Search ........... 379/433.13; 16/303, 330, 304, 331; 455/575.3, 90.3
See application file for complete search history.

(56) References Cited

U.S. PATENT DOCUMENTS

| | | | | |
|---|---|---|---|---|
| 5,937,062 A | * | 8/1999 | Sun et al. | 379/433.13 |
| 6,459,887 B2 | * | 10/2002 | Okuda | 379/433.13 |
| 6,633,643 B1 | * | 10/2003 | Ona | 379/433.13 |
| 6,658,111 B2 | * | 12/2003 | Nagashima | 379/433.13 |
| 6,886,221 B2 | * | 5/2005 | Minami et al. | 379/433.13 |
| 6,917,824 B2 | * | 7/2005 | Kobayashi | 455/575.3 |
| 6,920,668 B2 | * | 7/2005 | Hayashi | 16/303 |

* cited by examiner

*Primary Examiner*—Jack Chiang
(74) *Attorney, Agent, or Firm*—Dellett & Walters

(57) ABSTRACT

An auto-released hinge for a mobile phone has a barrel with two open ends. The barrel has a first flange formed inside the barrel. A first spiral slot is defined in the first flange. Two stop slots are defined in the barrel and two second spiral slots are defined between the respective stop slots and the first flange. A pintle is rotatably received in the barrel, and has a first end extending out from the barrel and a second flange formed adjacent a second end of the pintle. A protrusion is formed at an outer periphery of the pintle and received in the first spiral slot. Two ridges are formed adjacent the second flange and respectively blocked in the stop slots. A resilient member is provided outside the second end of the pintle. A fastener is positioned in the barrel to fasten the pintle and the resilient member.

4 Claims, 6 Drawing Sheets

AUTO-RELEASED HINGE FOR A MOBILE PHONE

BACKGROUND OF THE INVENTION

1. Field of the Invention

The present invention is related to a hinge for a mobile phone, and more particularly to a hinge installed between a cover and a body of the mobile phone.

2. Description of Related Art

Some mobile phones have a cover pivotally mounted on a body by a hinge, wherein the cover has an LCD panel installed therein, and the body has a keyboard installed therein.

However, the cover mounted on the body by some conventional hinges cannot automatically open, so that a user must continuously turn the cover until the cover is completely raised, which is very inconvenient.

Therefore, the invention provides an auto-released hinge to mitigate and/or obviate the aforementioned problems.

SUMMARY OF THE INVENTION

The main objective of the invention is to provide an auto-released hinge for a mobile phone which can easily open a cover of the mobile phone.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
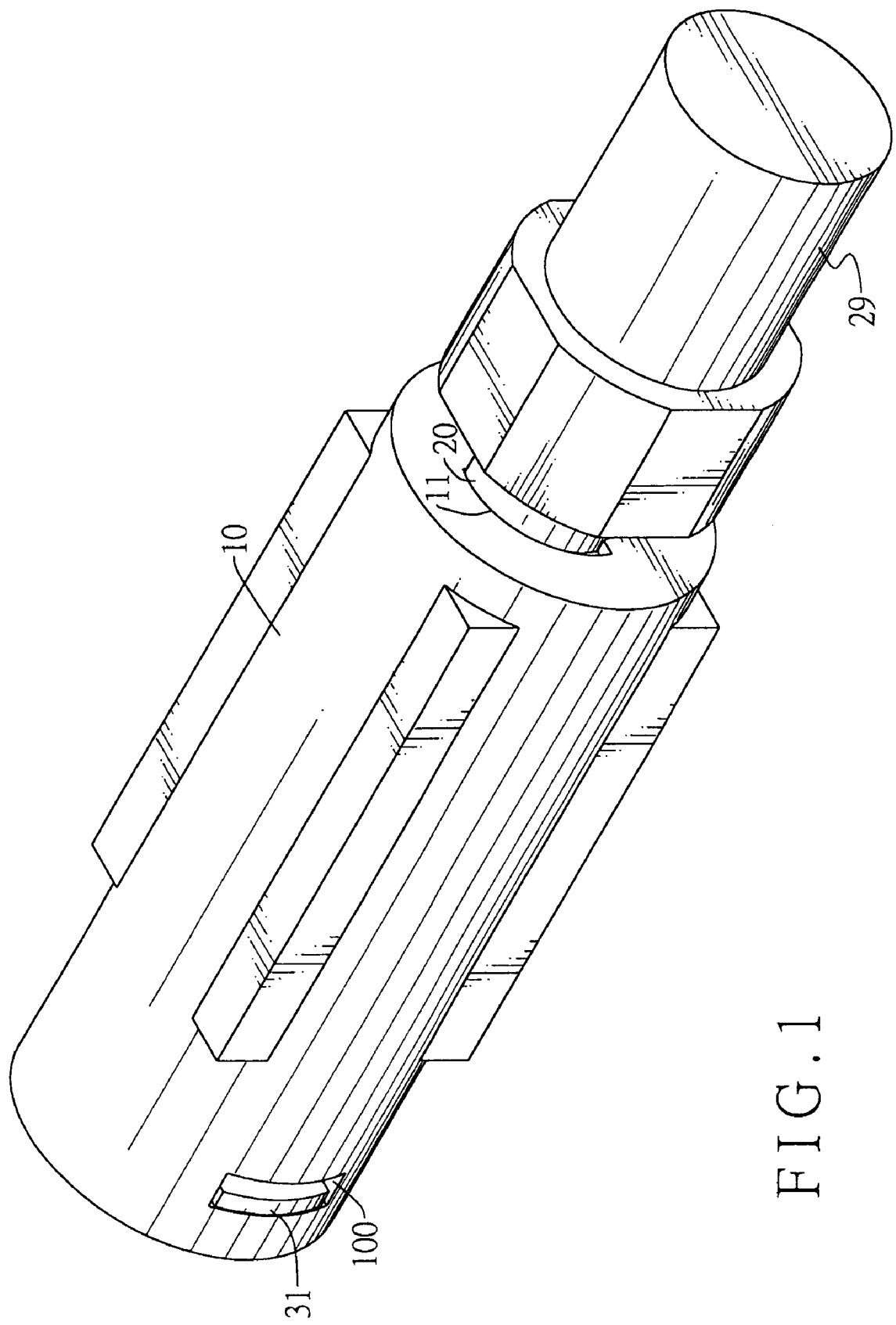
FIG. 1 is a perspective view of a hinge for a mobile phone in accordance with the present invention.
Figure 2:
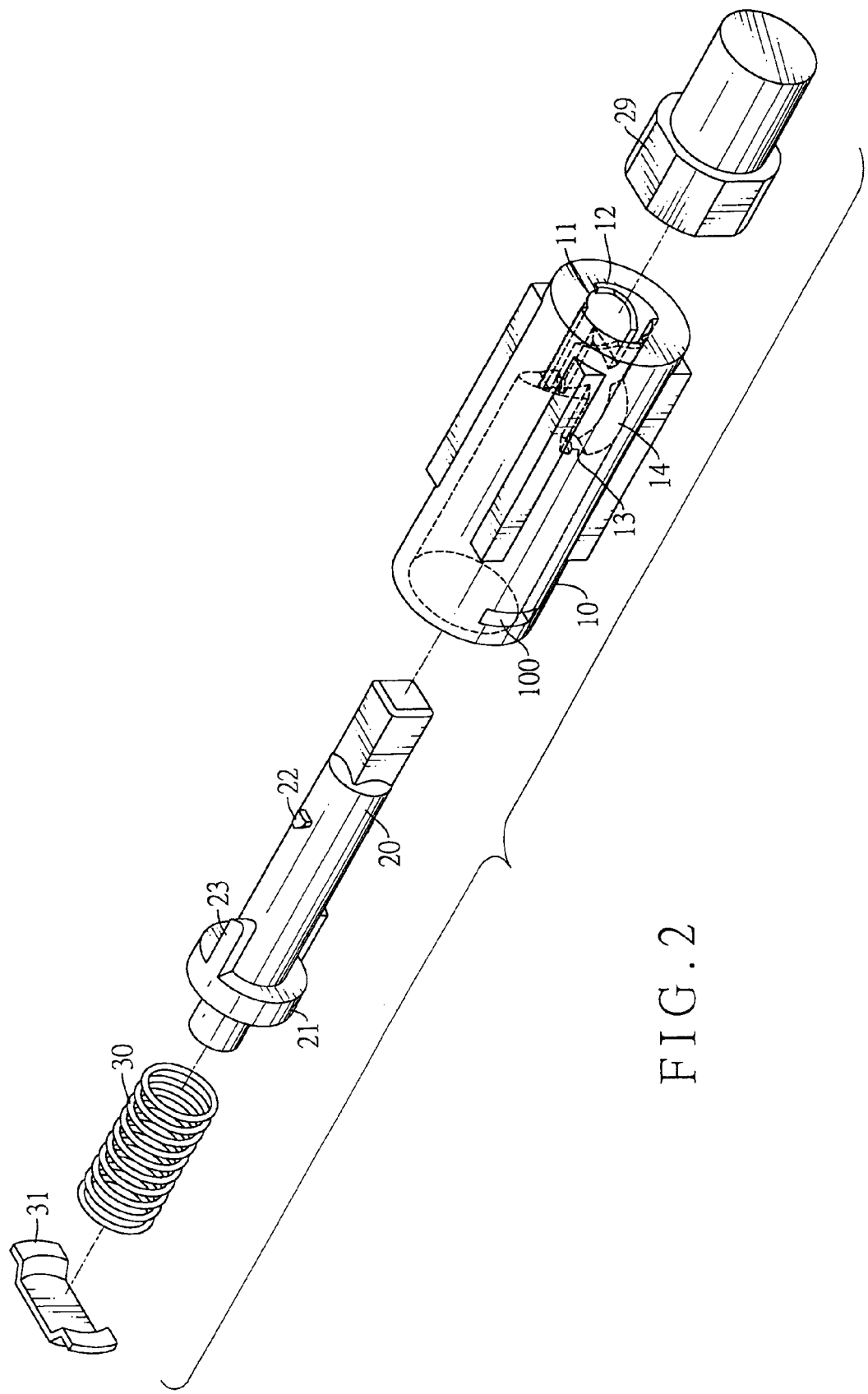
FIG. 2 is an exploded perspective view of the hinge in FIG. 1.
Figure 3:
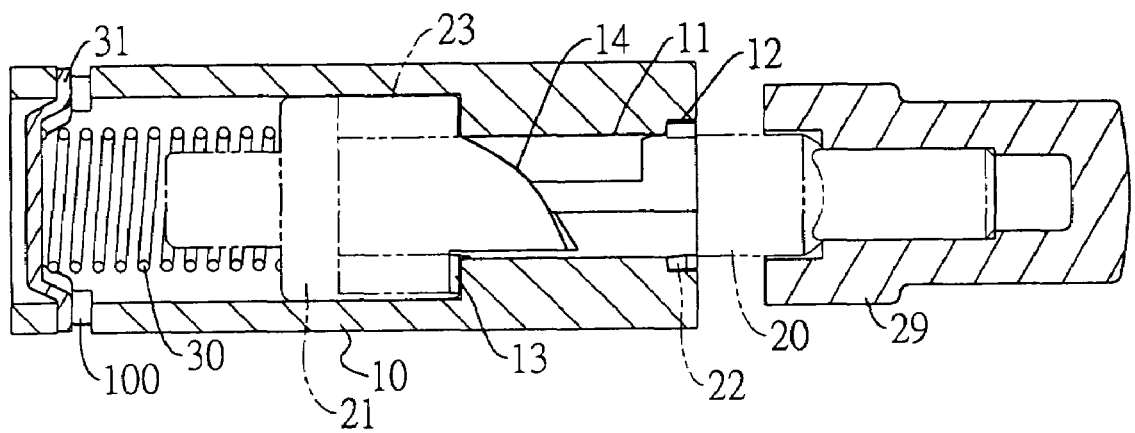
FIG. 3 is a cross sectional front view of the hinge in FIG. 1.

With reference to FIGS. 1, 2, 3, 4 and 8, an auto-released hinge for a mobile phone in accordance with the present invention is composed of a barrel (10), a pintle (20), a resilient member (30), a fastener (31) and a button (29).

The barrel (10) with two open ends is installed on a body (50) of the mobile phone. A first flange (11) is formed inside the barrel (10) at the first open end. A first spiral slot (12) is defined in an inner wall of the first flange (11) and extends in a half circumference of the first flange (11) (e.g. an circumferential angle of 180°). Two stop slots (13) are defined in a middle portion of the barrel (10) at two diametrically opposite inner sides. Two second spiral slots (14) are defined at two diametrically opposite inner sides of the barrel (10) and between the respective stop slots (13) and the first flange (11). Two openings (100) are defined through an outer periphery of the barrel (10) at the diametrically opposite sides and adjacent the second open end.

The pintle (20) is installed on a cover (51) of the mobile phone and rotatably received in the barrel (10). A head (not numbered) with a non-circular cross section is formed at a first open end of the pintle (20) and extends out from the first end of the barrel (10). A second flange (21) is formed adjacent a second end of the pintle (20) and received in the barrel (10). A protrusion (22) is formed at an outer periphery of the pintle (20), is adjacent to the head and is received in the first spiral slot (12). Two ridges (23) are formed at two diametrically opposite sides of the pintle (20) and is adjacent to the second flange (21), and travels of the ridges (23) are respectively limited in the stop slots (13).

The resilient member (30) is received in the barrel (10) and provided outside the second end of the pintle (20). The fastener (31) has two wings (not numbered) positioned in the openings (100) to fasten the resilient member (30) and the pintle (20) in the barrel (10). The button (29) is mounted on the head of the pintle (20).

Figure 4:
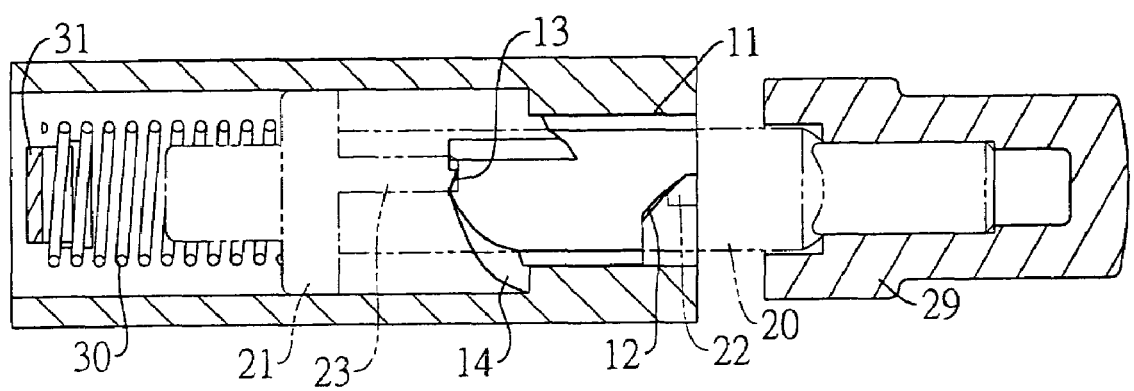
FIG. 4 is a cross sectional top view of the hinge in FIG. 1.
Figure 5:
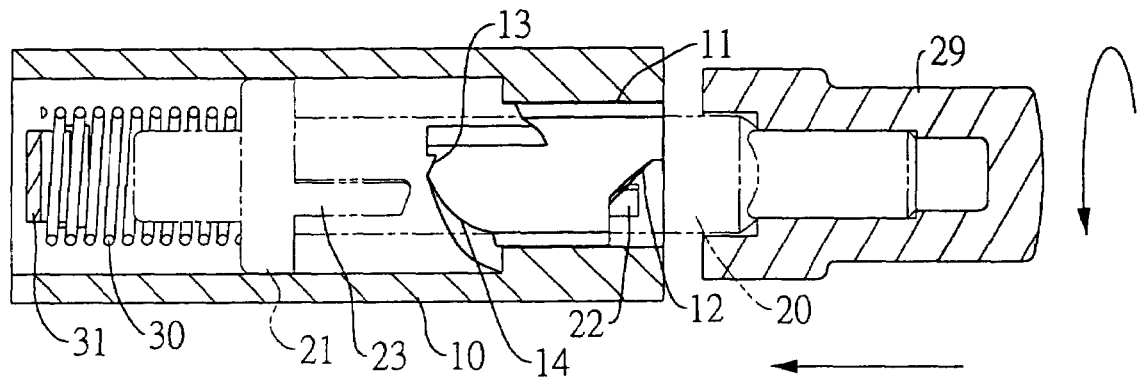
FIG. 5 is a cross sectional top view of the hinge when a button is pressed towards a barrel.

With reference to FIGS. 4 and 5, when a user presses the button (29), the protrusion (22) is moved in the barrel (10) along the first spiral slot (12) and the resilient member (30) is compressed, so the pintle (20) is slightly rotated about the barrel (10) to enable the ridges (23) to release from the respective stop slots (13).

Figure 6:
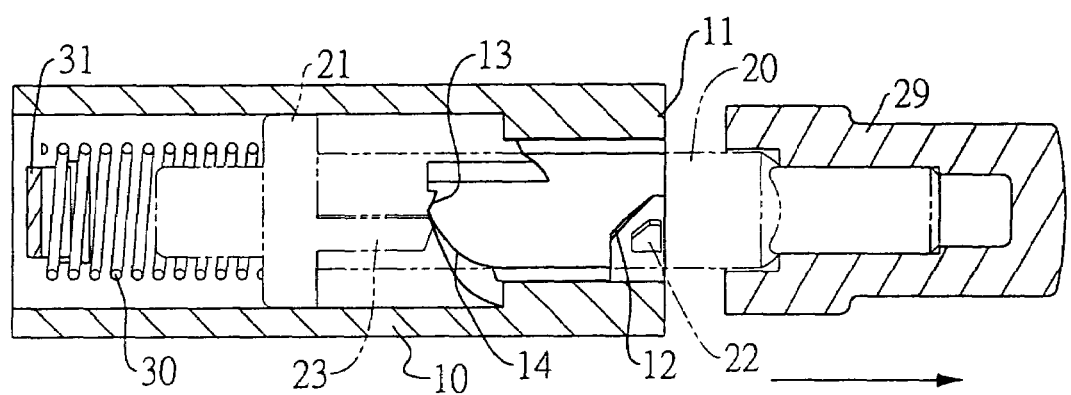
FIG. 6 is a cross sectional top view of the hinge when the button is released and a pintle is moved outwards.
Figure 7:
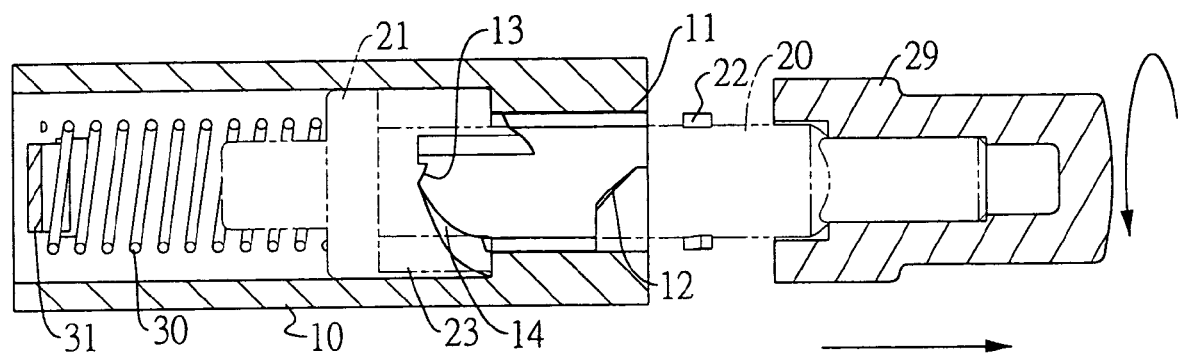
FIG. 7 is a cross sectional top view of the hinge when the pintle is completely moved outwards to turn the barrel with respect to the pintle.
Figure 8:
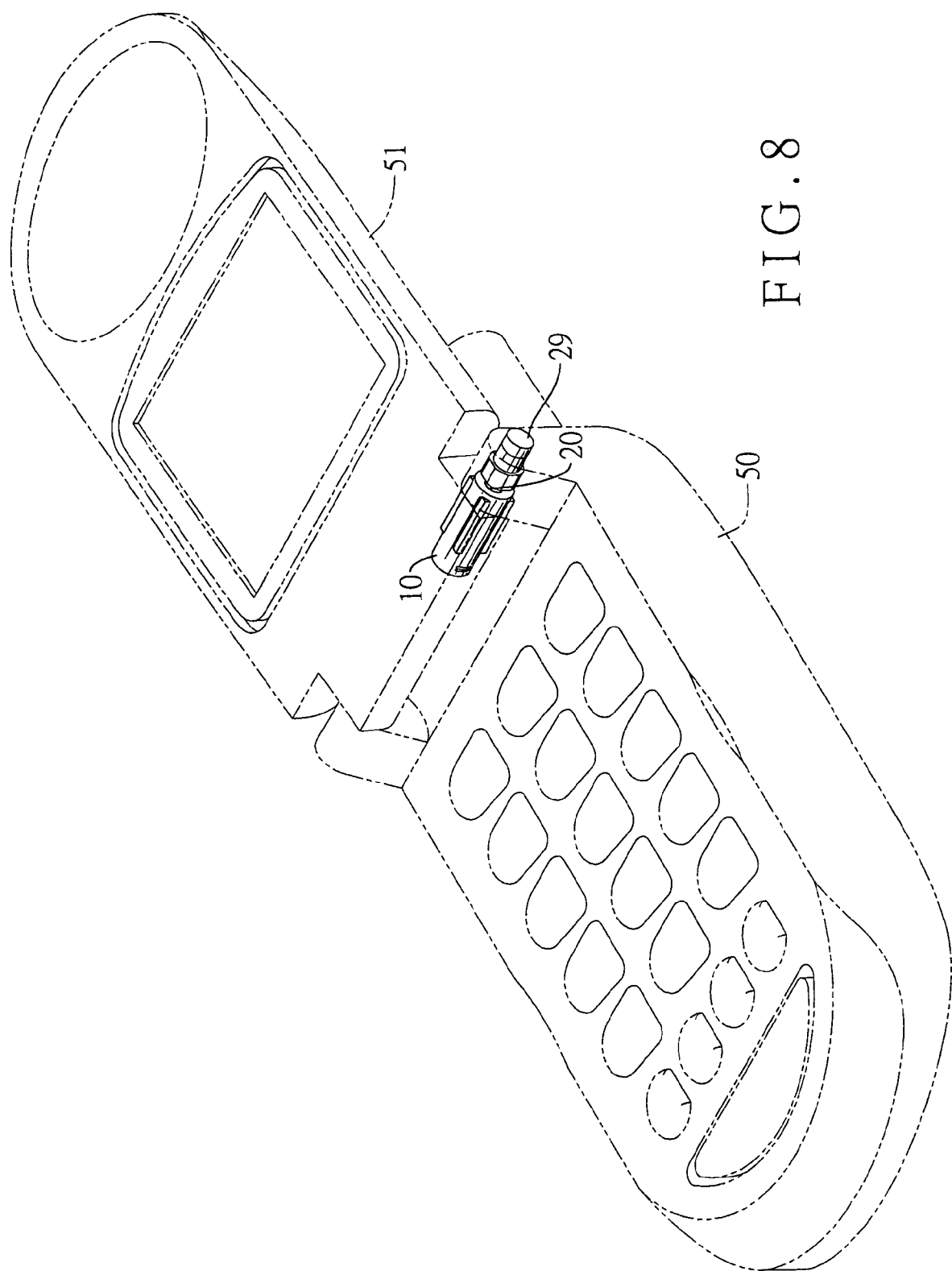
FIG. 8 is a schematic view of the mobile phone assembled with the hinge in accordance with the present invention.

With reference to FIGS. 6 and 7, when the user releases the button (29), under the elastic force of the resilient member (30), the pintle (20) is pushed outwards and the ridges (23) are respectively contacted with the second spiral slots (14). While the pintle (20) is further moved outwards, the ridges (23) are guided by the second spiral slots (14) to rotate the pintle (20) about the barrel (10) until the ridges (23) are stopped by the first flange (11). Therefore, the cover (5 1) integrated with the pintle (20) is raised from the body (50) by the rotation of the pintle (20), as shown in FIG. 8.

When the user closes the cover (51), the pintle (20) is invertedly rotated about the barrel (10) and retracted into the barrel (10). Meanwhile, the ridges (23) are moved towards the stop slots (13) along the second spiral slots (14). When the cover (51) is abutted the body (50), the ridges (23) are blocked in the stop slots (13) again.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An auto-released hinge for a mobile phone comprising:
   a barrel with two open ends, the barrel having a first flange formed inside the barrel at the first open end, a first spiral slot defined in an inner wall of the first flange, two stop slots defined in a middle portion of the barrel and at two diametrically opposite inner sides, and two second spiral slots defined at two diametrically opposite inner sides of the barrel and between the respective stop slots and the first flange;
   a pintle rotatably received in the barrel, the pintle having a head formed at a first end of the pintle and extending out from the first open end of the barrel, a second flange formed adjacent a second end of the pintle and received in the barrel, a protrusion formed at an outer periphery of the pintle and adjacent the head and received in the first spiral slot, two ridges formed at two diametrically opposite sides of the pintle and adjacent the second flange and respectively blocked in the stop slots;

a resilient member provided outside the second end of the pintle; and a fastener positioned in the barrel to fasten the pintle and the resilient member in the barrel.

2. The auto-released hinge as claimed in claim 1, wherein the first spiral slot extends in a half circumference of the barrel.

3. The auto-released hinge as claimed in claim 1, wherein the barrel has two openings defined through an outer periphery of the barrel and at the diametrically opposite sides and adjacent the second open end, and the fastener has two wings respectively positioned in the openings.

4. The auto-released hinge as claimed in claim 1 further comprising a button mounted on the head of the pintle.

* * * * *